United States Patent [19]
Bernard

[11] Patent Number: 5,986,728
[45] Date of Patent: Nov. 16, 1999

[54] OPTICALLY ENHANCE DAY/NIGHT LIQUID CRYSTAL DISPLAY BACKLIGHT WITH TIR LENS AND BOTH LIGHT SOURCES ON SAME SIDE OF WAVEGUIDE

[75] Inventor: Edwin I. Bernard, Sylmar, Calif.

[73] Assignee: Litton Systems, Inc., Woodland Hills, Calif.

[21] Appl. No.: 08/898,986

[22] Filed: Jul. 23, 1997

[51] Int. Cl.⁶ ................................................. G02F 1/1335
[52] U.S. Cl. ............................. 349/68; 349/65; 349/64; 362/31
[58] Field of Search ................................. 349/62, 64, 68, 349/67; 362/26, 31, 245, 327, 328, 332, 336, 337, 338, 340, 224, 225, 309, 299

[56] References Cited

U.S. PATENT DOCUMENTS

| | | | |
|---|---|---|---|
| 5,143,433 | 9/1992 | Farrell | 349/68 |
| 5,211,463 | 5/1993 | Kalmanash | 362/26 |
| 5,404,869 | 4/1995 | Parkyn, Jr. et al. | 126/699 |
| 5,479,275 | 12/1995 | Abileah | 362/26 |
| 5,587,816 | 12/1996 | Gunjima et al. | 349/62 |
| 5,720,545 | 2/1998 | Shaw | 362/245 |

*Primary Examiner*—Kenneth Parker
*Attorney, Agent, or Firm*—Lewis B. Sternfels

[57] ABSTRACT

Light emitting devices are combined with non-imaging optical elements to create a backlighting system for liquid-crystal displays (LCDs). A pair of optically isolated sub-systems, or sections a night vision imaging system (NVIS) (14) and a daylight system (12) are combined to provide optimum display legibility in ambient illuminations ranging from bright sunlight to total darkness. The sub-systems utilize non-imaging optics based upon total internal reflection (TIR) and light reflection, both coupled to a light emitting source, such as fluorescent tubes (34) and other linearly shaped light sources. Light reflectors (32) are shaped to concentrate light onto non-imaging optics lens (30) so as to compensate for non-linear characteristics of the TIR lenses.

22 Claims, 2 Drawing Sheets

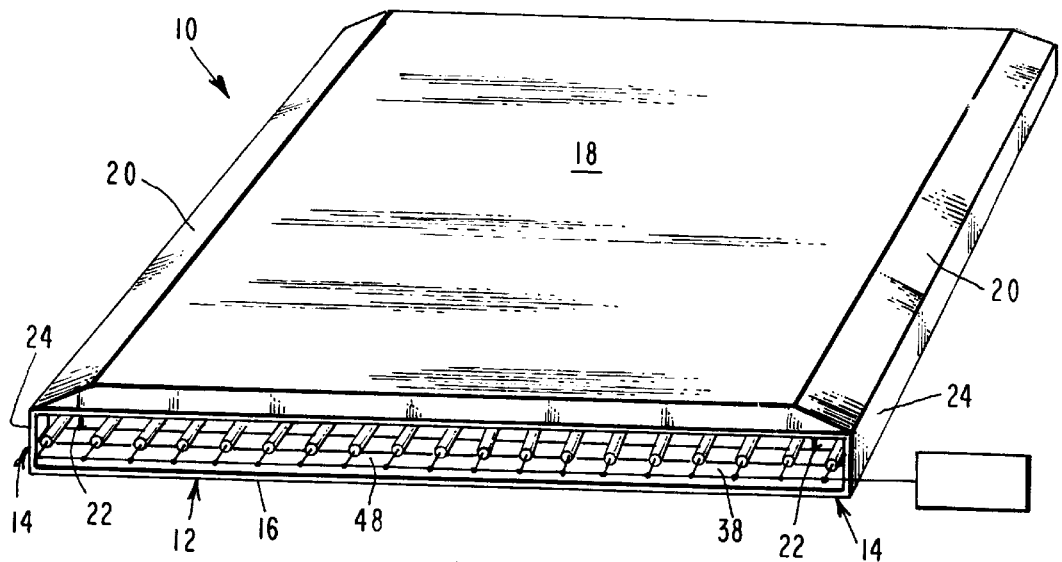
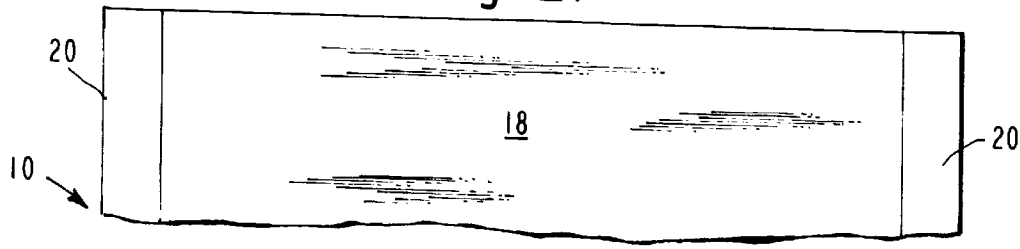
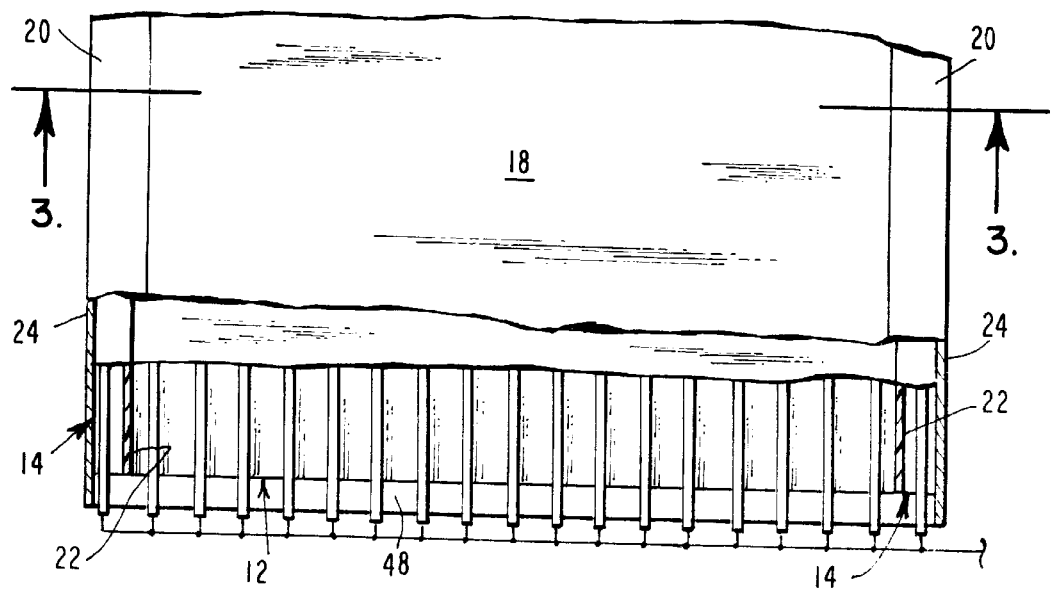

OPTICALLY ENHANCE DAY/NIGHT LIQUID CRYSTAL DISPLAY BACKLIGHT WITH TIR LENS AND BOTH LIGHT SOURCES ON SAME SIDE OF WAVEGUIDE

BACKGROUND OF THE INVENTION

CROSS-REFERENCE TO RELATED APPLICATION

Not Applicable

REFERENCE REGARDING FEDERAL SPONSORSHIP

Not Applicable

REFERENCE TO MICROFICHE APPENDIX

Not Applicable

1. Field of the Invention

The present invention relates to liquid crystal displays and, more particularly, for optimizing display legibility in ambient illuminations ranging from bright sunlight to total darkness, including use with night vision imaging systems (NVIS).

2. Description of Related Art and Other Considerations

Prior art backlight systems for liquid crystal devices generally do not efficiently collect light. One conventional system utilizes liquid crystal displays (LCDs) in conjunction with a white painted chamber within which light is generated. In this system, a wide angle of uniform light is provided. However, because LCDs have limited viewing angles and when they are placed within the wide angle of uniform light, a substantial amount of back-lighting is ineffectual. The result is white light without an image, or interference with the image, with low contrast at the ends of the viewing area. In part to compensate for both loss of light and low contrast, a large number of fluorescent tubes or equivalent light sources must be employed.

In some prior art systems, a planar mirror may be utilized. However, were a total internal reflecting (TIR) lens to be used, as suggested in the present invention, because TIR lenses are non-linear, which produces a non-uniform illumination, the TIR lens tends to direct a greater portion of the light to its center than at its edges. Therefore, its center is more brightly illuminated than its edges. As a result, this non-linearity in the lens produces in a non-uniform illumination which deleteriously affects the displayed images.

Some conventional backlight systems for liquid crystal devices, such as described in U.S. Pat. No. 5,211,463, perform satisfactorily but consume considerable power, because the optical lighting system is generally inefficient.

SUMMARY OF THE INVENTION

These and other problems are successfully addressed and overcome by the present invention. Light emitting devices are combined with non-imaging optical elements to create a backlighting system for color liquid-crystal displays (LCDs).

In general, a pair of optically isolated sub-systems, a night vision imaging system (NVIS) and a daylight system, are combined to provide optimum display legibility in ambient illuminations ranging from bright sunlight to total darkness, and may include operation using night vision goggles. The sub-systems utilize non-imaging optics based upon total internal reflection (TIR) and light reflection, both coupled to a light emitting source, such as fluorescent tubes and other linearly shaped light sources. The light reflectors are shaped to concentrate light onto the non-imaging optics so as to compensate for the non-uniform illumination produced by the non-linear characteristics of the TIR lenses.

Several advantages are derived from the above. Sufficient background light for the LCDs is provided (1) to reduce power requirements, (2) to achieve a compact package, and (3) to facilitate thermal management by drawing heat from the light sources. Thus, the backlighting system for color liquid-crystal displays is very efficient. At least 50% of power can be saved as compared to conventional systems. Non-imaging optics have the capability of capturing light emitted from a source very efficiently and collimating it towards the liquid crystal display for day operation and a light waveguide for night. The backlight assembly can also be packaged in a very flat profile typically of approximately one-half inch in thickness.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 1 is perspective view of a preferred embodiment of the present invention;

FIG. 2 is a top view of the embodiment depicted in FIG. 1, with a portion of its cover removed to expose its interior;

DETAILED DESCRIPTION OF THE PREFERRED EMBODIMENTS

Figure 3:
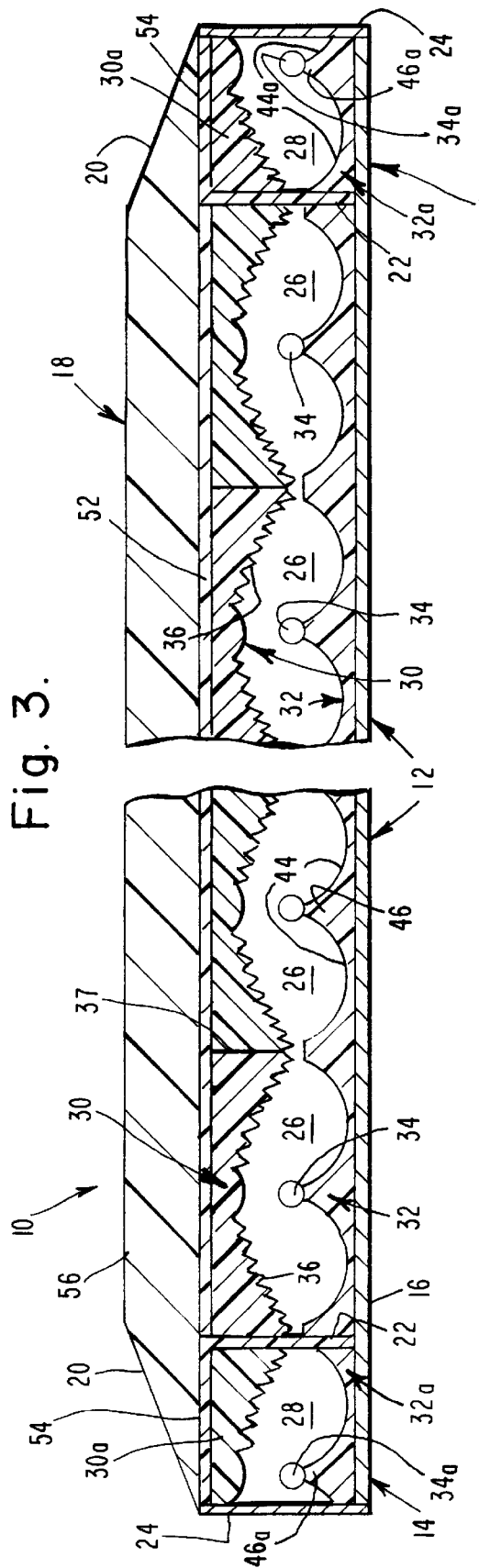
FIG. 3 is an enlarged view of the embodiment shown in FIG. 2 taken along lines 3—3 thereof.

Referring to FIGS. 1–3, an optically enhanced dual liquid crystal display backlight system 10 includes a centrally placed daylight illumination section 12 and a pair of night illumination parts 14 placed at the ends of section 12. Sections 12 and 14 are supported on a base 16 and covered by a waveguide 18. The waveguide terminates at its sides 20 by oppositely directed sloped portions to present a trapezoidal appearance. NVIS illumination section 14 is optically isolated at its from day illumination sections 12 by optical barriers 22 to prevent transmission of light therebetween. This is necessary to ensure that all night illumination is transmitted through NVIS filter 54. Reflectors 24 are positioned at the exterior sides of night illumination section 14. Daylight illumination part 12 comprises a plurality of internal, contiguously positioned optical cells 26, and night illumination section 14 each include a side cell 28.

Figure 4:
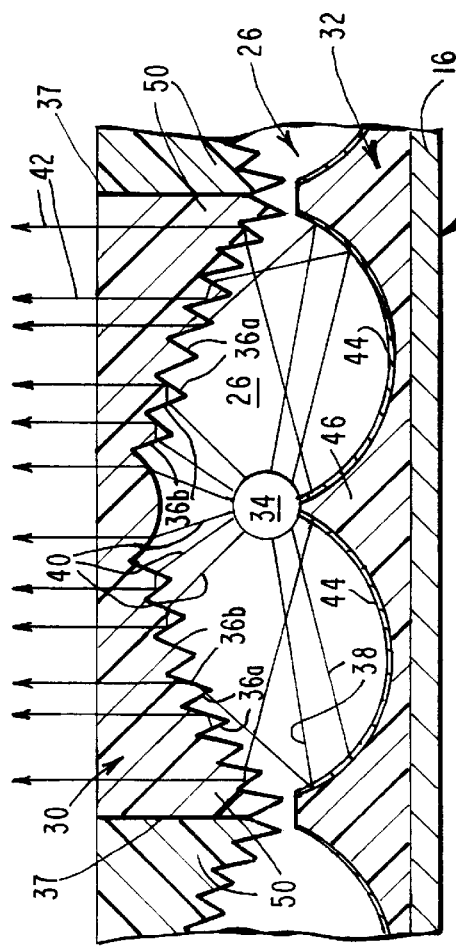
FIG. 4 is a still further enlarged view of one part of the daylight illumination section (equally so for the night illumination section) shown in FIG. 3, to illustrate how selected rays of light are transmitted directly and by reflection from a source into a collimated pattern.

As best shown in FIGS. 3 and 4, each internal cell 26 of daylight illumination section 12 includes a total internal reflection (TIR) lens 30, a reflector segment 32, and a fluorescent tube 34. While total internal reflection (TIR) lens 30 is illustrated as comprising several contiguously positioned lenses joined together by a proper light conducting bonding material 37, they may be formed integrally. The choice is one of expense. The number of fluorescent tubes used will depend on the overall size of the LCD.

Each internal cell total internal reflection lens 30 has facets 36a and 36b to transmit input light from fluorescent tubes 34 into a collimated output light 42. Facets 36a and 36b are configured to relay and convert reflected and direct light (respectively designated by indicia 38 and 40 in FIG. 4) from fluorescent tube 34 into collimated light 42. The collimated light is directed to waveguide 18 and thence to a liquid crystal device. Because a typical total internal reflection lens does not evenly transmit light, it concentrates light at its center than at its edges; therefore, the light tends to be brighter at its center than at its edges. Internal cell reflector 32 is designed to correct this aberration as immediately discussed below.

Reflector segment 32 comprises a pair of total internal reflection lens surfaces 44 of concave configuration joined at their centers by an upstanding part 46. Fluorescent tube 34 or other linearly shaped light source is supported on each center support 46 and at their ends in any convenient manner by a pair of cradles 48 (see FIGS. 1 and 2) (only one being shown in the drawings). The support of tubes 34 along their lengths atop center supports 46 may be augmented by any appropriate means, such as by a gel, to protect the tubes from damage occurring, for example, from shock and vibration. Reflector surfaces 44 of lenses 32 are so curved as to concentrate a greater portion of light at the outer portions (designated by indicium 50) of TIR lens 30, to compensate for the non-uniform illumination produced by any nonlinearities in the total internal reflection lens.

Waveguide 18 includes a brightness enhancing film 52 placed atop daylight illumination section 12 and a pair of NVIS optical filters 54 respectively placed atop night illumination sections 14. A diffuser plate 56 is bonded to the top surface of waveguide 18.

Each night illumination section 14 includes a partial total internal reflection lens 30a and a reflector segment 32a. Reflector segment has an upstanding part 46a on which a fluorescent tube 34a is supported. Aside from being segmented, each total internal reflection lens 30a and a reflector segment 32a is configured and operates exactly as total internal reflection lens 30 and reflector segment 32 of daylight illumination section 12.

In operation, downward rays 38 from tubes 34 and 34a are reflected upwards in a predetermined profile. Direct rays 40 and reflected rays 38 impinge onto the facets of Total Internal Reflecting (TIR) lens 30 and 30a. Tubes 34 in the middle which cover the entire LCD active area are used for daylight applications. Vertical reflectors 24 help to minimize losses. Since a much lower level of illumination is required for night operation, the reduced efficiency in optical transmission is not significant. The rays from these are injected into wave guide 18 and its diffuser plate 56 to illuminate the LCD by scattered light. In Night Vision System Imaging (NVIS) applications, optical filters 54 are placed in the light path to filter out infra-red radiation to meet system requirements.

Uniform illumination for day and night operations are achieved differently. TIR lens 30 and 30a by itself collimates the light emitted over the upper 180° arc from the sources very efficiently, the intensity being highest directly above the light source. The main purpose of reflector 32 and 32a, as shown in FIG. 4, is to redirect rays emitted in the lower 180° towards TIR lens 30 and 30a so that nearly all the light generated by the fluorescent tube can be used to illuminate the LCD. Not all of these rays are collimated as some of them (rays 38) enter the opposite facets 36b of the TIR lens compared to the direct rays 40 to direct facets 36a. This is helpful in scattering the rays. A second objective of reflector 32 and 32a, as stated above, is to shape the reflection profile to compensate for non-uniform illumination produced by the nonlinearities of TIR lens 30 as much as possible. Diffuser 52 then performs the final touch of creating a uniform backlit surface having a dispersion angle matching the viewing angle profile of the LCD.

Although the invention has been described with respect to a particular embodiment thereof, it should be realized that various changes and modifications may be made therein without departing from the spirit and scope of the invention.

What is claimed is:

1. An optically enhanced dual display backlight apparatus (10) for display of a liquid crystal-device, comprising:

a daylight illumination section (12) including a plurality of internal, contiguously positioned optical cells (26) bordered by a pair of side cells, each said internal cell (26) including a reflector (32), a total internal reflection lens (30) and a fluorescent Tube (34), said internal cell reflectore (32) having a pair of concave reflectively surfaced portions (44) joined at a central support (46) supporting said fluorescent tube to direct light therefrom to said total internal reflection lens (30), each said concave portion being configured to shape its reflection profile to compensate for any non-uniform illumination produced by said total internal reflection lens, and each said internal cell total internal reflectiorn lens (30) having facets (36a, 36b) which are configured to relay reflected and direct light from said internal cell fluorescent tube (34) as collimated light to a liquid crystal device;

a pair of opaque optical barriers (22) respectively positioned against said internal side cells;

a night light illumination section (14) including a pair of external optical cells respectively having a first side positioned adjacent said opaque optical barriers and a second side comprising a side reflector (24) having means for reflecting light into its external optical cell, each said external cell including a reflector portion (32a), a total internal reflection fans portion (30a), and a fluorescent tube (34a) bounded by said opaque optical barrier and said side reflector;

each said external cell reflector (24) having first and second concave reflectively surfaced portions (44a) joined at a central support (46a) supporting said external cell fluorescent tube (34a) to direct light therefrom to said total internal reflection lens (30a), each said concave portion (44a) being configured to shape its reflection profile to compensate for any non-uniform illumination produced by said total internal reflection lens, and each said external cell total internal reflection lens (30a) having facets which are configured to relay reflected and direct light from said external cell fluorescent tube as collimated light to a liquid crystal device; and a waveguide (18) positionally against a liquid crystal device for transmitting light thereto and including a brightness enhancing film (52) placed atop said daylight illumination section (12) and a pair of NVIS optical filters (54) respectively placed atop said night illumination sections (14), said diffuser plate (56) contacting the top of said waveguide (18).

2. An optically enhanced dual display backlight apparatus for illuminating an object under all ambient light conditions, including daylight and low light conditions, comprising:

a substantially flat waveguide;

a daylight illumination section positioned on one side of said waveguide, and including means for illuminating the object under daylight ambient light conditions;

a night light illumination section positioned on the same side of said waveguide, and including means for illuminating the object under low light ambient light conditions; and optical barrier means optically separating said daylight and said night light sections for preventing leakage of light therebetween, said waveguide being so positioned alone the front of said daylight illumination section as to superimpose light emitted from said night illumination section with light emitted from said daylight illumination section.

3. An optically enhanced dual display backlight apparatus for illuminating an object under all ambient light conditions, including daylight and low light conditions, comprising:

a daylight illumination section positioned on one side of the object and including means for illuminating the object under daylight ambient light conditions, said daylight illumination section further including a plurality of internal, contiguously positioned optical cells, in which each is provided with reflector means, a total internal reflection lens and a source of light, and wherein each said internal cell reflector means is so positioned with respect to said light source as to direct light therefrom to said total internal reflection lens, and each said internal cell total internal reflection lens is configured to relay reflected and direct light from said internal cell light source as collimated light;

a night light illumination section positioned on the same side of the object, and including means for illuminating the object under low light ambient light conditions; and optical barrier means optically separating said daylight and said night light sections for preventing leakage of light therebetween.

4. An apparatus according to claim 3 wherein said night light illumination section includes at least one external optical cell positioned adjacent said barrier means and including reflector means, a total internal reflection lens, and a source of light, in which said external cell reflector means is so positioned with respect to said external cell light source as to direct light therefrom to said total internal reflection lens, and said external cell total internal reflection lens is configured to relay reflected and direct light from said external cell light source as collimated light.

5. An apparatus according to claim 4 in which each of said internal and external cell reflector means is configured to shape its reflection profile to compensate for any non-uniform ilumination produced by its respective total internal reflection lens.

6. An apparatus according to claim 5 in which each of said internal and external cell reflection lens has facets facing said reflector means and said light source to enable the collimation of the light.

7. An apparatus according to claim 6 in which said internal, contiguously positioned optical cells include at least one internal cell and two cells defining a pair of outermost cells bounding said internal cell, and said optical barrier means comprises a pair of opaque optical barriers respectively positioned against said outermost internal cells.

8. An optically enhanced dual display backlight apparatus for illuminating an object under all ambient light conditions, including daylight and low light conditions, comprising:

a daylight illumination section positioned on one side of the object and including means for illuminating the object under daylight ambient light conditions;

a night light illumination section positioned on the same side of the object, and including means for illuminating the object under low light ambient light conditions, said night light illumination section further including at least one external optical cell positioned adjacent said barrier means and including reflector means, a total internal reflection lens, and a source of light, in which said external cell reflector means is so positioned with respect to said external cell light source as to direct light therefrom to said total internal reflection lens, and in which said external cell total internal reflection lens is configured to relay reflected and direct light from said external cell light source as collimated light; and optical barrier means optically separating said daylight and said night light sections for preventing leakage of light therebetween.

9. An apparatus according to claim 8 wherein said daylight illumination section includes a plurality of internal, contiguously positioned optical cells, in which each is provided with reflector means, a total internal reflection lens and a source of light, and further wherein each said internal cell reflector means is so positioned with respect to said light source as to direct light therefrom to said total internal reflection lens, and each said internal cell total internal reflection lens is configured to relay reflected and direct light from said internal cell light source as collimated light.

10. An optically enhanced dual display backlight apparatus for illuminating an object under all ambient light conditions, including daylight and low light conditions, comprising:

a daylight illumination section positioned on one side of the object and including means for illuminating the object under daylight ambient light conditions, said daylight illumination section and a plurality of internal, contiguously positioned optical cells, in which each said internal cell is provided with reflector means, a total internal reflection lens and a source of light positioned within said reflector means and said total internal reflector lens;

a night light illumination section positioned on the same side of the object, and including means for illuminating the object under low light ambient light conditions; and optical barrier means optically separating said daylight and said night light sections for preventing leakage of light therebetween.

11. An apparatus according to claim 10 in which said night light illumination section includes at least one external optical cell positioned adjacent said barrier means and including a reflector, a total internal reflection lens, and a source of light.

12. An apparatus according to claim 11 in which:

each of said internal cell reflector means has reflectors so positioned with respect to said internal cell light source as to direct light therefrom to said total internal reflection lens, and each said internal cell total internal reflection lens is configured to relay reflected and direct light from said internal cell light source as collimated light; and each of said external cell reflector means has reflectors so positioned with respect to said external cell light source as to direct light therefrom to said total internal reflection lens, and each of said external cell total internal reflection lens is configured to relay reflected and direct light from said external cell light source as collimated light.

13. An apparatus according to claim 12 in which each said internal and external cell reflector means is configured to shape its reflection profile to compensate for any non-uniform illumination produced by its respective total internal reflection lens.

14. An apparatus according to claim 13 in which each of said internal and external cell reflection lens has facets facing said reflector means and said light source to enable the collimation of the light.

15. An optically enhanced dual display backlight apparatus for illuminating an object under all ambient light conditions, including daylight and low light conditions, comprising:

a daylight illumination section positioned on one side of the object and including means for illuminating the object under daylight ambient light conditions;

a night light illumination section positioned on the same side of the object, and including means for illuminating the object under low light ambient light conditions and at least one external optical cell which includes reflector means, a total internal reflection lens, and a source of light positioned within said reflector means and said total internal reflector lens; and optical barrier means positioned between said night light illumination section external optical cell and said daylight illumination section and optically separating said daylight and said night light sections for preventing leakage of light therebetween.

16. An apparatus according to claim 15 wherein said daylight illumination section includes a plurality of internal, contiguously positioned optical cells, in which each said internal cell is provided with reflector means, a total internal reflection lens and a source of light positioned within said reflector means and said total internal reflector lens.

17. An apparatus according to claim 16 in which:

each of said internal cell reflector means has reflectors so positioned with respect to said internal cell light source as to direct light therefrom to said total internal reflection lens, and each of said internal cell total internal reflection lens is configured to relay reflected and direct light from said internal cell light source as collimated light; and each of said external cell reflector means has reflectors so positioned with respect to said external cell light source as to direct light therefrom to said total internal reflection lens, and each of said external cell total internal reflection lens is configured to relay reflected and direct light from said external cell light source as collimated light.

18. An apparatus according to claim 17 in which each said internal and external cell reflector means is configured to shape its reflection profile to compensate for any non-uniform illuminatin produced by its respective total internal reflection lens.

19. An apparatus according to claim 18 in which each of said internal and external cell reflection lens has facets facing said reflector means and said light source to enable the collimation of the light.

20. An apparatus according to claim 19 wherein said object comprises a liquid crystal device for display thereof:

in which said internal, contiguously positioned optical cells include at least one internal cell and two cells defining a pair of outermost cells bounding said internal cell;

in which said barrier means comprises a pair of optical barriers positioned adjacent said outermost internal cells, and said night light section comprises a pair of night illumination sections and separated therefrom respectively by said optical barriers; and further comprising a brightness enhancing film placed atop said daylight illumination section, a pair of NVIS optical filters respectively placed atop said night illumination sections, a liquid crystal device, a waveguide positionable against said liquid crystal device for transmitting light thereto, and a diffuser plate contacting the top of said waveguide.

21. An optically enhanced dual display backlight apparatus for illuminating an object under all ambient light conditions comprising:

a daylight illumination section positioned on one side of the object for illuminating the object under daylight ambient light conditions, said daylight illumination section including a plurality of internal, contiguously positioned optical cells, in which each is provided with reflector means, a total internal reflection lens and a source of light, wherein each said internal cell reflector means is so positioned with respect to said light source as to direct light therefrom to said total internal reflection lens, and each said internal cell total internal reflection lens is configured to relay reflected and direct light from said internal cell light source as collimated light;

a night light illumination section positioned on the same side of the object for illuminating the object under low light ambient light conditions, said night light illumination section including at least one external optical cell which includes reflector means, a total internal reflection lens, and a source of light, wherein said external cell reflector means is so positioned with respect to said external cell light source as to direct light therefrom to said total internal reflection lens, and said external cell total internal reflection lens is configured to relay reflected and direct light from said external cell light source as collimated light; and optical barrier means optically separating said daylight and said night light sections for preventing leakage of light therebetween.

22. An optically enhanced dual display backlight apparatus for illuminating an object under all ambient light conditions comprising:

a daylight illumination section positioned on one side of the object for illuminating the object under daylight ambient light conditions, said daylight illumination section including a plurality of internal, contiguously positioned optical cells, in which each said internal cell is provided with reflector means, a total internal reflection lens and a source of light positioned within said reflector means and said total internal reflector lens;

a night light illumination section positioned on the same side of the object for illuminating the object under low light ambient light conditions, said night light illumination section including at least one external optical cell provided with reflector means, a total internal reflection lens, and a source of light positioned within said reflector means and said total internal reflector lens; and optical barrier means optically separating said daylight and said night light sections for preventing leakage of light therebetween.

* * * * *